United States Patent Office 3,796,651
Patented Mar. 12, 1974

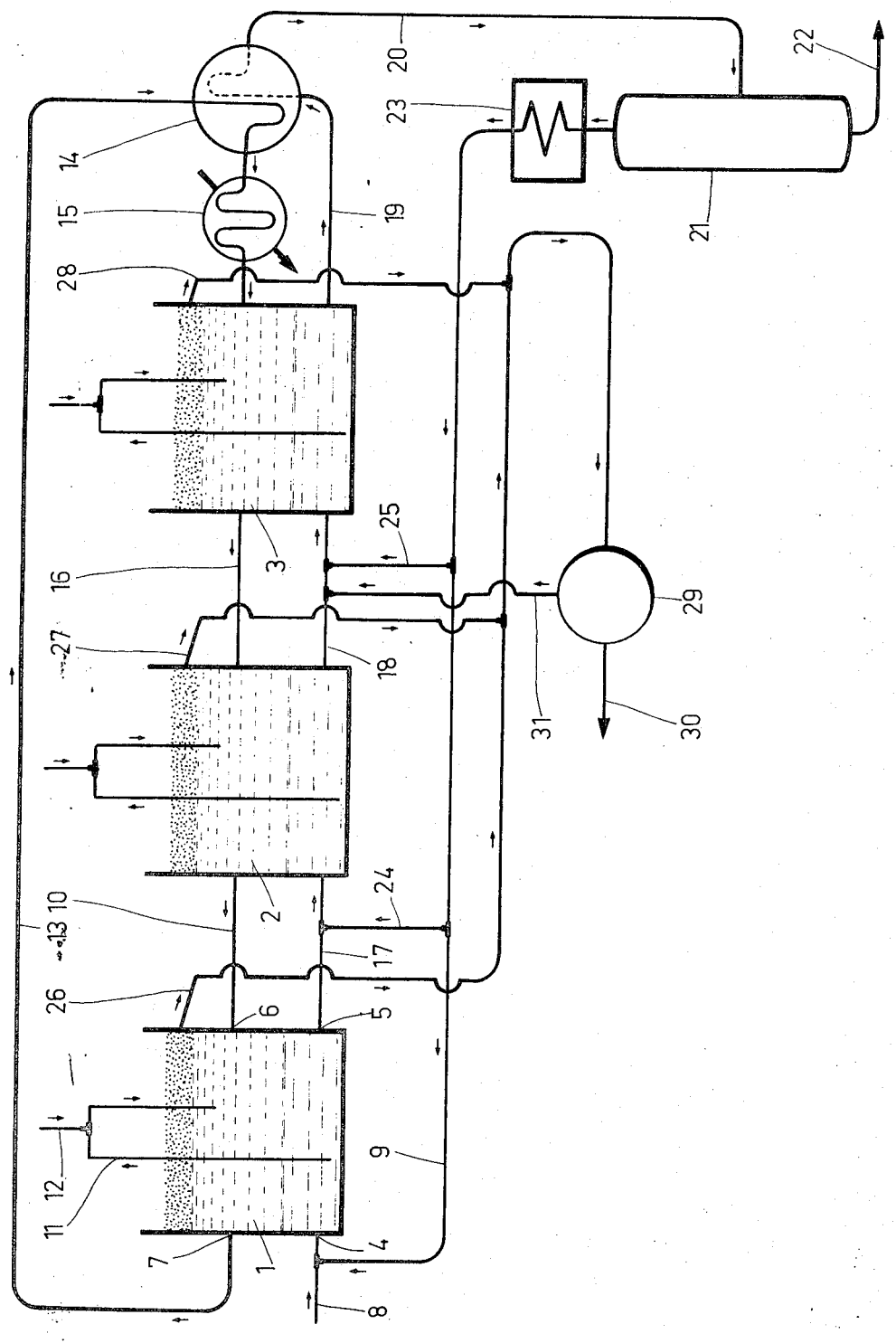

3,796,651
DEWAXING PROCESS
Alexandre Rojey, Vanves, France, assignor to Institut Francois du Petrole des Carburants et Lubrifiants
Filed May 16, 1972, Ser. No. 253,848
Claims priority, application France, May 19, 1971, 18,341
Int. Cl. C10g 43/00, 43/04
U.S. Cl. 208—24
15 Claims

ABSTRACT OF THE DISCLOSURE

Process for separating a crystallizable paraffin from a charge containing it, comprising diluting said charge with a suitable solvent, dispersing it into an aqueous phase, liquid at the dewaxing temperature, together with an inert gas for raising up the formed crystals, and separating said crystals from the solution.

---

This invention relates to a dewaxing process for separating a crystallizable paraffin. It is also useful for separating different paraffin fractions from one another.

It is known to separate paraffin wax from oil by cooling in the presence of a solvent in internally scraped tubes (scraper chillers) and then to separate the paraffin crystals from the oil through drum filters. Such a process is expensive. As a matter of fact, it is necessary to pass the oil through a number of tubes so as to obtain a sufficient exchange surface and each of these tubes must be provided with scrapers in order to avoid the accumulation of the paraffin wax on the internal walls thereof. Moreover, the cooling is more intense on the peripheral wall than in the center, and this is not favorable to a regular growth of the crystals. The separation of the crystals from the oil requires thereafter very large filtration surfaces which necessitates, in industrial plants, the use of filter batteries of large sizes, working at low temperature.

It is also known to separate the paraffin crystals by flotation, by bubbling gas through the mixture of oil and crystals (U.S. Pats. 2,847,356; 2,904,496, and 3,347,775). A major inconvenience of this method is in the fact that the flotation is carried out within the oil phase, which makes difficult the raising of the paraffin and yields crystals much impregnated with oil.

It is also known to separate the paraffin crystals in the presence of an aqueous phase so as to decrease the oil retention (U.S. Pats. 2,645,598 and 2,791,539).

In every case, the use of a surface active agent is suitable in order to form an homogeneous mixture of the phases and for transferring the paraffin crystals to the aqueous phase. The oil is separated either by washing the formed emulsion with a solvent or by displacing the aqueous phase dispersed in the oil by means of an air stream. According to this procedure the separation between the three phases, paraffin, aqueous phase and mixture of oil and solvent, is difficult.

It has been discovered that a simple and efficient manner of causing the separation between the paraffin crystals and the oil and solvent mixture consists of dispersing the oil and solvent mixture containing the crystals within a continuous aqueous phase by simultaneously introducing an inert gas stream into the aqueous phase. The solvent is so selected that the specific gravity of the oil and solvent mixture be higher than the specific gravity of the aqueous phase, which itself is higher than the specific gravity of the paraffin crystals.

The solvent or mixture of solvents to be used must consequently include a solvent selected from the solvents of high specific gravity such as chlorinated solvents, e.g. dichloromethane, carbon tetrachloride, dichlorethylene, trichlorethylene. This solvent may be used in admixture with other solvents having preferably antisolvent properties. As example of antisolvents, there can be mentioned acetonitrile, ketones, particularly acetone, or, among the chlorinated solvents, 1,2-dichlorethane. There will be advantageously used, according to the invention, a mixture of chlorinated solvents such as, for example, trichlorethylene and 1,2-dichlorethane. As inert gas, there can be used for example, nitrogen, air, hydrogen, methane, ethane, propane, carbon dioxide or ammonia.

A preferred embodiment consists of introducing the mixture of oil and solvent as a continuous phase and dispersing this mixture throughout the aqueous phase by means of a recycling device.

There are thus formed three phases, i.e. a foam enriched phase with paraffin as an upper layer, the aqueous phase and a lower phase of oil and solvent mixture.

The recirculation can be continued either by means of a pump or by entrainment of the oil by means of the inert gas—when the recirculation is obtained by means of a pump, the inert gas may be introduced either in the recirculation circuit or just at the outlet of the dispersing apparatus—the ratio of the recirculation flow rate of the mixture of oil and solvent to the input flow rate of said mixture may vary for example from 1 to 200, preferably from 20 to 200, and the ratio of the inert gas flow rate to the input flow rate of the mixture oil+solvent may vary for example from 0.1 to 10. The ratio of the gas flow rate to the recirculation flow rate of the above-mentioned mixture may be for example from 0.01 to 0.1. Such an arrangement provides for the continuous feeling and withdrawal, on the one hand, of the oil and solvent mixture and, on the other hand, of the aqueous phase, which permits the use of this aqueous phase as cooling agent. For crystallizing the paraffin, the oil+solvent mixture must be cooled down to a temperature generally lower than the pour point desired for the dewaxed oil and the aqueous phase must be kept liquid at this temperature. Most of the usual aqueous cooling agents may be convenient, particularly the aqueous solutions of salts, the solutions of alcohols or ketones and preferably an aqueous solution of a salt such as lithium chloride. As continuous aqueous phase, there can also be used, for example, an aqueous solution of sodium chloride, calcium chloride, glycol or glycerol.

The crystallization is preferably conducted in the same apparatus where the phases are separated from one another.

In order to cool down the aqueous cooling solution, it can be passed through an external cooling circuit.

The cooling by direct contact of the oily phase with the aqueous cooling agent provides for a homogeneous and efficient cooling due to the great exchange surface obtained between the oil+solvent phase which is dispersed and the aqueous phase which is continuous.

Moreover, the recirculation results in a continuous renewal of the interface between the two phases while allowing to maintain the two phases at uniform temperatures and concentrations.

Another cooling procedure consists of using, as inert gas, a cooling gas. The main problem to be solved for performing a cooling with direct contact consists of circulating oil so as to avoid its setting. The continuous separation of the crystals makes it possible to circulate an oil with a low crystal content and consequently to avoid its setting.

It has been also discovered that the flow of ascending crystals increases with the amount of crystals in the oil and solvent mixture. Accordingly, it is particularly advantageous to proceed with sequential stages at decreasing temperatures and paraffin concentrations. It is easy to provide a great number of stages, for example by fractionating each crystallization tank by means of vertical flanges provided with an opening for the passage of the oil and an opening for the passage of the aqueous cooling agent, each of the resulting compartments optionally comprising one or more devices for dispersing the oil in the cooling agent.

The use of a series of stages has also the advantage of improving the thermal contact between the two phases and particularly of bringing closer the temperature of the cooler at its output, and the temperature of the oil at its input, so as to recover a maximum of cooling values for example by counter-currently passing through a heat exchanger the oil and the cooling agent discharged from the unit. Moreover, there is thus achieved a progressive cooling of the oil, which favors the growth of the crystals.

The foam obtained at the upper layer in each of these stages, essentially comprises paraffin crystals which crystallize within the temperature range between the input temperature of the oil-solvent mixture and the output temperature of the same mixture, this range being in some cases very narrow when there are used numerous stages.

According to the process, it is thus possible to fractionate the paraffins in various fractions. Particularly, there are thus prepared solid paraffin waxes whose commercial value is high and which need to be purified to such an extent as to contain for example less than 0.5% of oil, and soft paraffins waxes, whose commercial value is low due to their low melting point.

A more complete fractionation is also possible, the resulting fractions being optionally treated in a further stage, by known separation methods such as distillation, adsorption on molecular sieves or clathration.

The process is also suitable for the separation of various paraffin fractions contained in a paraffin mixture previously separated from an oil. The paraffin mixture is dissolved in a solvent or solvent mixture and thereafter treated according to the present process.

The foam recovered in each stage above the aqueous phase contains a still substantial oil amount, the enrichment factor being defined by the ratio:

$$\frac{A/B}{C/D}$$

wherein

A is the paraffin weight in the foam
B is the oil weight in the foam
C is the paraffin weight in the feed
D is the oil weight in the feed.

This factor may be, for example, about 5. The purity of the paraffin wax in the foam depends particularly on the decantation time. In order to avoid the use of large crystallization tanks and long residence times, it is possible to make use of a decanter in which the foam is further decanted on a cooler stream, the oil being recovered at the bottom of the decanter.

The enrichment factor may thus increase from 5 to about 6 or 7.

In order to reduce the oil content to a very low value, for example to a value lower than 1%, several methods can be considered.

The crystals can be separated from the oil by any of the known methods such as filtration with washing by means of a solvent or centrifugation. Some solvent may also be added to the foam and then at least a fraction of the paraffin wax recrystallized by separating the crystals in accordance with the present process. The liquid which is carried along with the crystals has a lower oil content than before the introduction of the solvent and the ratio of the paraffin wax amount to the oil amount increases.

In order to reduce the amount of solvent used, it is advantageous to operate in several stages. A first embodiment consists of introducing fresh solvent at the inlet of each stage. For still reducing the amount of solvent used, it is possible to introduce, at the inlet of each stage, the solvent issued from the following stage, thereby circulating counter-currently the paraffin wax and the solvent which progressively increases its oil content.

The average residence time of the charge is dependent on various factors such as temperature, liquid recycling rate, gas flow rate, gas dispersion degree, desired purification degree. It may thus vary in a wide range, for example from 10 minutes to 5 hours, particularly from 1 h. 30' to 5 hours.

The invention will be further illustrated by the following examples, given by way of non-limitative illustration, with reference to the accompanying drawing.

EXAMPLE 1

An installation comprising three rectangular tanks 1, 2, 3, is fed with 4 liters/hour of a mixture of 100 g. of a "150 neutral solvent" oil having a pour point of 31.5° C. and a 15% by weight paraffin content, per 350 cc. of a solvent consisting of 250 cc. of trichlorethylene and 100 cc. of 1,2-dichlorethane.

Each tank of the apparatus, under working conditions, contains 6 liters of this mixture and 10 liters of a brine containing 18 g./liter of lithium chloride. Each tank is provided with an oil inlet and outlet and with a brine inlet and outlet, respectively indicated by references 4, 5, 6 and 7, as far as the tank 1 is concerned.

The fresh charge is conveyed to tank 1 through pipe 8 together with the solvent coming from line 9. The mixture circulates in each tank through circuit 11 at a flow rate of 400 liters/hour, and an air flow rate of 15 liters/hour is sent through duct 12 to the recirculation circuit. The brine is discharged from tank 1 through pipe 13 and is conveyed to tank 3 after having passed through the heat exchanger 14 and having received make up cooling values from the cooling system 15, then to the tank 2 through pipe 16 and is returned to tank 1 through pipe 10.

The operating temperature is −6° C. in tank 1, −15° C. in tank 2 and −22° C. in tank 3.

The oil treated in tank 1 is sent to tank 2 through pipe 17 where a pumping system identical to 11 disperses the same into brine, then through pipe 18 into tank 3, where it is subjected to the same treatment. It is discharged through pipe 19 and passes through the heat exchanger 14 before being conveyed, through pipe 20, to the vaporization column 21.

The dewaxed oil made free from the solvent is withdrawn at 22. The pour point of the so-dewaxed oil is −12° C.

The vaporized solvent is condensed in 23 and sent back to the system input. Additional amounts of fresh solvent may be optionally introduced through lines 24 and 25 into the tanks 2 and 3.

The foam obtained above brine is recovered through 26, 27 and 28. It contains an oil fraction corresponding to 50% by weight of the total weight of oil and paraffin. The content of entrained oil is limited to 5% in the device 29. This device consists of three stages of flotation maintained at a a temperature of −20° C., each containing 3 liters of an oil+solvent mixture and 3 liters of brine and being fed with a solvent flow of 6 liters/hour.

The paraffin wax obtained as resulting product is withdrawn through 30 and the oil+solvent phase is reintroduced into the oil circulation stream feeding tank 3 through pipe 31.

The oil level in the tanks may be kept constant by adjusting the oil feeding and withdrawal rates. The equipment groups of the installation, such as the pumps or gas compressors, are not shown.

EXAMPLE 2

A Kuwait oil "200 neutral solvent" having a 10% paraffin wax content is diluted to the extent of 350 cc. per 100 g. with a solvent consisting of 250 cc. of trichloroethylene and 100 cc. of 1,2-dichloroethane. 6 liters/hour of the mixture are fed to an installation consisting of a series of 10 stages, each stage containing 1 500 cc. of mixture and 2 500 cc. of brine. The recirculation flow rate (dispersion of the organic phase into the aqueous phase) at each stage is 30 liters/h. and the air flow rate is 20 l./h. The operating temperature is from +10° C. for the first stage to −20° C. for the last stage. The pour point of the obtained oil is −12° C.

EXAMPLE 3

A paraffin wax obtained by dewaxing a Zarzaitine oil 150 NS at −20° C. and recovering all of the formed crystals is solubilized into trichlorethylene in a proportion of 100 g. of paraffin wax per 300 cc. of trichlorethylene. One liter per hour of the mixture is fed at a temperature of +30° C. to an installation formed of 4 tanks, respectively operated at 20° C., 10° C., 3° C. and −5° C. and each containing 500 cc. of mixture and 800 cc. of brine. In each tank, the recirculation flow rate of the oily phase in the aqueous phase is 50 liters/h. and the air flow rate 10 liters/h. There are thus obtained 5 paraffin fractions whose crystallization temperatures in the presence of trichlorethylene are respectively from +30° C. to +20° C., from +20° C. to +10° C., from +10° C. to +3° C., from +3° C. to −5° C. for the four first fractions and below −5° C. for the last one.

What I claim is:

1. A process for separating a crystallizable paraffin from a hydrocarbon charge containing said crystallizable paraffin admixed with at least one other more difficultly crystallizable paraffin, consisting essentially of: introducing said charge dissolved in a solvent, as a dispersed phase into a continuous aqueous phase having a sufficiently low temperature to form crystals of the crystallizable paraffin, the solvent being so selected that the specific gravity of the solution of charge in the solvent be higher than the specific gravity of the aqueous phase which itself is higher than the specific gravity of the paraffin crystals, simultaneously dispersing an inert gas through the aqueous phase so as to elevate said crystallizable paraffin crystals, and separating said elevated crystals and the solution of charge impoverished in crystallizable paraffin from the continuous aqueous phase.

2. A process according to claim 1 wherein the charge is an oil and the aqueous phase is a brine at a temperature lower than the desired pour point for the oil.

3. A process according to claim 1 in which the average residence time is from 10 minutes to 5 hours.

4. A process according to claim 1 wherein the crystallization and the separation of the crystals are carried out in several stages at decreasing temperature levels.

5. A process according to claim 4, wherein the charge diluted in a solvent and the aqueous cooling solution circulate counter-currently through the stages.

6. A process according to claim 1 wherein the charge is formed of a mixture of normally solid paraffins.

7. A process according to claim 1 wherein the paraffin crystals are purified by decantation in the presence of an aqueous cooling agent.

8. A process according to claim 1 wherein the recovered paraffin is purified by filtration or centrifugation.

9. A process according to claim 1 wherein the recovered paraffin is purified by addition of solvent followed by the separation of the crystals after partial or total recrystallization according to the process of claim 1.

10. A process according to claim 9, wherein the paraffin purification is carried out in several stages in series, with the addition of solvent at the inlet of each stage.

11. A process according to claim 9 wherein the purification of the paraffin is carried out in several stages in series, the solvent circulating counter-currently with respect to the paraffin.

12. A process according to claim 10 wherein the charge is recirculated continuosuly through the aqueous phase.

13. A process according to claim 12 wherein the charge is continuously dispersed again in the aqueous phase and carried along with the inert gas flow used for raising up the paraffin crystals.

14. A process according to claim 1 wherein the solvent is selected from the chlorinated solvents.

15. A process according to claim 12, wherein the ratio of the recirculation flow rate to the inlet flow rate is from 1 to 100.

References Cited
UNITED STATES PATENTS

| | | | |
|---|---|---|---|
| 2,645,598 | 7/1953 | Myers et al. | 208—29 |
| 2,168,143 | 8/1939 | Schutte | 208—29 |

HERBERT LEVINE, Primary Examiner

U.S. Cl. X.R.

208—29, 33